United States Patent
Rosen et al.

(10) Patent No.: US 8,103,270 B2
(45) Date of Patent: *Jan. 24, 2012

(54) FIXED CELL COMMUNICATION SYSTEM WITH REDUCED INTERFERENCE

(75) Inventors: Harold Rosen, Santa Monica, CA (US); Ying Feria, Manhattan Beach, CA (US); Parthasarathy Ramanujam, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 12/046,271

(22) Filed: Mar. 11, 2008

(65) Prior Publication Data
US 2008/0153481 A1    Jun. 26, 2008

Related U.S. Application Data

(62) Division of application No. 09/661,986, filed on Sep. 14, 2000, now Pat. No. 7,369,847.

(51) Int. Cl.
*H04W 4/00* (2009.01)

(52) U.S. Cl. ........ 455/429; 455/427; 455/447; 455/12.1; 455/63.1; 455/67.11; 455/3.02; 455/13.2; 455/98

(58) Field of Classification Search .......... 455/429, 455/427, 447, 12.1, 63.1, 67.11, 3.02, 13.2, 455/98
See application file for complete search history.

(56) References Cited

U.S. PATENT DOCUMENTS

| | | | |
|---|---|---|---|
| 4,364,052 A * | 12/1982 | Ohm | 343/781 P |
| 5,379,046 A * | 1/1995 | Tsujimoto | 342/378 |
| 5,765,098 A | 6/1998 | Bella | |
| 6,157,685 A | 12/2000 | Tanaka et al. | |
| 6,526,288 B1 | 2/2003 | Khalifa et al. | |
| 6,556,845 B1 | 4/2003 | Ide et al. | |
| 7,317,916 B1 | 1/2008 | Chang et al. | |
| 7,369,847 B1 * | 5/2008 | Rosen et al. | 455/429 |
| 7,627,284 B2 | 12/2009 | Wang | |
| 2001/0055320 A1 * | 12/2001 | Pierzga et al. | 370/480 |

FOREIGN PATENT DOCUMENTS

JP    2000138974 A  *  5/2000

OTHER PUBLICATIONS

Notice of Allowance dated Dec. 30, 2009 in U.S. Appl. No. 09/661,967, filed Sep. 14, 2000, Ying J. Feria et al.
Non-final Office action dated Apr. 26, 2010 in U.S. Appl. No. 11/928,577, filed Oct. 30, 2007, Donald C.D. Chang et al.
Notice of Allowance dated May 17, 2010 in U.S. Appl. No. 09/858,989, filed May 15, 2001, Donald C.D. Chang et al.
Notice of Allowance dated Oct. 6, 2010 in U.S. Appl. No. 11/928,577, filed Oct. 30, 2007, Chang et al.

* cited by examiner

*Primary Examiner* — Nghi Ly

(57) ABSTRACT

A communication system has a high altitude communication device that has an antenna for directing beams to a fixed cell pattern with a polarity of cells. A specific pattern of cells having the same communication resource is provided. Cells having the same resource may be separated. The antenna is shaped to suppress interference with locations having the same resource. The areas not having the same resource are not suppressed to allow the system to have maximum capacity and allow a smaller antenna aperture.

14 Claims, 5 Drawing Sheets

FIXED CELL COMMUNICATION SYSTEM WITH REDUCED INTERFERENCE

CROSS-REFERENCE TO RELATED APPLICATIONS

The present disclosure is a divisional of U.S. application Ser. No. 09/661,986 entitled "Fixed Cell Communication System with Reduced Interference" filed on Sep. 14, 2000, now U.S. Pat. No. 7,369,847 the disclosure of which is incorporated by reference.

TECHNICAL FIELD

The present disclosure relates generally to communications systems and, more particularly, to preventing interference in fixed cell systems.

BACKGROUND

In this communication age, content providers are increasingly investigating ways in which to provide more content to users as well as interfacing with a larger group of users. The latest communications systems use digital broadcast satellites to broadcast information to users.

In addition to satellites, stratospheric platforms are currently under development. Stratospheric platforms may be unmanned vehicles that can fly for several months at a height of about 60,000 feet such as a solar powered electric plane that is modular in design and may be configured to carry a variety of payloads. Stratospheric platforms have numerous advantages over geostationary satellites, including that a large bandwidth density can be projected over a small but populated area, associated transmission delays are significantly reduced, the power required for transmitting and receiving is substantially smaller, and the user elevation are higher in general. Also, these stratospheric platforms can be deployed relatively rapidly compared to satellites and thus, if a business need increases, the system capability may be increased quickly through deploying new platforms.

Commonly, such communication systems have a high altitude communications device such as a satellite or a stratospheric platform as described above. Also, such systems have user terminals and a gateway station or plurality of gateway stations that communicate with the high altitude communications device and link the user terminals to terrestrial networks.

Because the frequency resources are scarce for over-air transmissions, various multiplexing schemes are used to provide a greater number of communication signals within an allocated communication ban. Such schemes include code division multiple access ("CDMA"), time division multiple access ("TDMA"), frequency division multiple access ("FDMA"), or combinations of these schemes. In addition to the multiplexing schemes, various polarizations may be used to increase system resources.

In a fixed cell structure, beams having different system resources such as frequencies or polarizations are directed to fixed cell. However, due to the antenna structure and the nature of a beam, side lobes from the beam may interfere with communications in cells having the same communication characteristic such as frequency and polarization. To reduce side lobes and achieve a high peak antenna directivity and low side lobes, the antenna aperture is commonly enlarged. A tradeoff may occur if the antenna aperture size is fixed and thus the side lobe characteristic may be sacrificed for a lower main lobe directivity. The drawback to a large aperture is the higher payload mass associated therewith. A low main lobe to side lobe ratio also implies a reduce number of users of the system.

It is typically a goal of communication system designers to reduce mass and increase the number of potential users without increasing the mass or size of the system. It would therefore be desirable to meet these goals without increasing interference between beams.

SUMMARY

The present disclosure may provide a communication system having a high main lobe to side lobe ratio in selected areas to reduce interference with other beams using the same system resources such as frequency and polarization.

In one aspect of the disclosure, a communication system has a high altitude communication device having an antenna for generating a first plurality of beams. Each of the plurality of beams has a first frequency resource, a plurality of main lobes directed to one of a first plurality of cells, and a plurality of side lobes. The high altitude communication device generates a second plurality of beams having a second resource directed to one of a second plurality of cells. The antenna is formed so that the side lobes of the first plurality beams are selectively suppressed in the first plurality of cells having said first resource.

In a further aspect of the disclosure, a method of operating communication system comprises the steps of generating a fixed reuse pattern in a service area from a high altitude communications device, said pattern having at least a first resource cell and a second resource cell; selectively suppressing a side lobe of a beam having a first resource so a non-side lobe suppressed portion aligns with a cell having said second resource.

One advantage of the disclosure is that by implementing the present disclosure, the spacecraft weight does not have to be increased.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
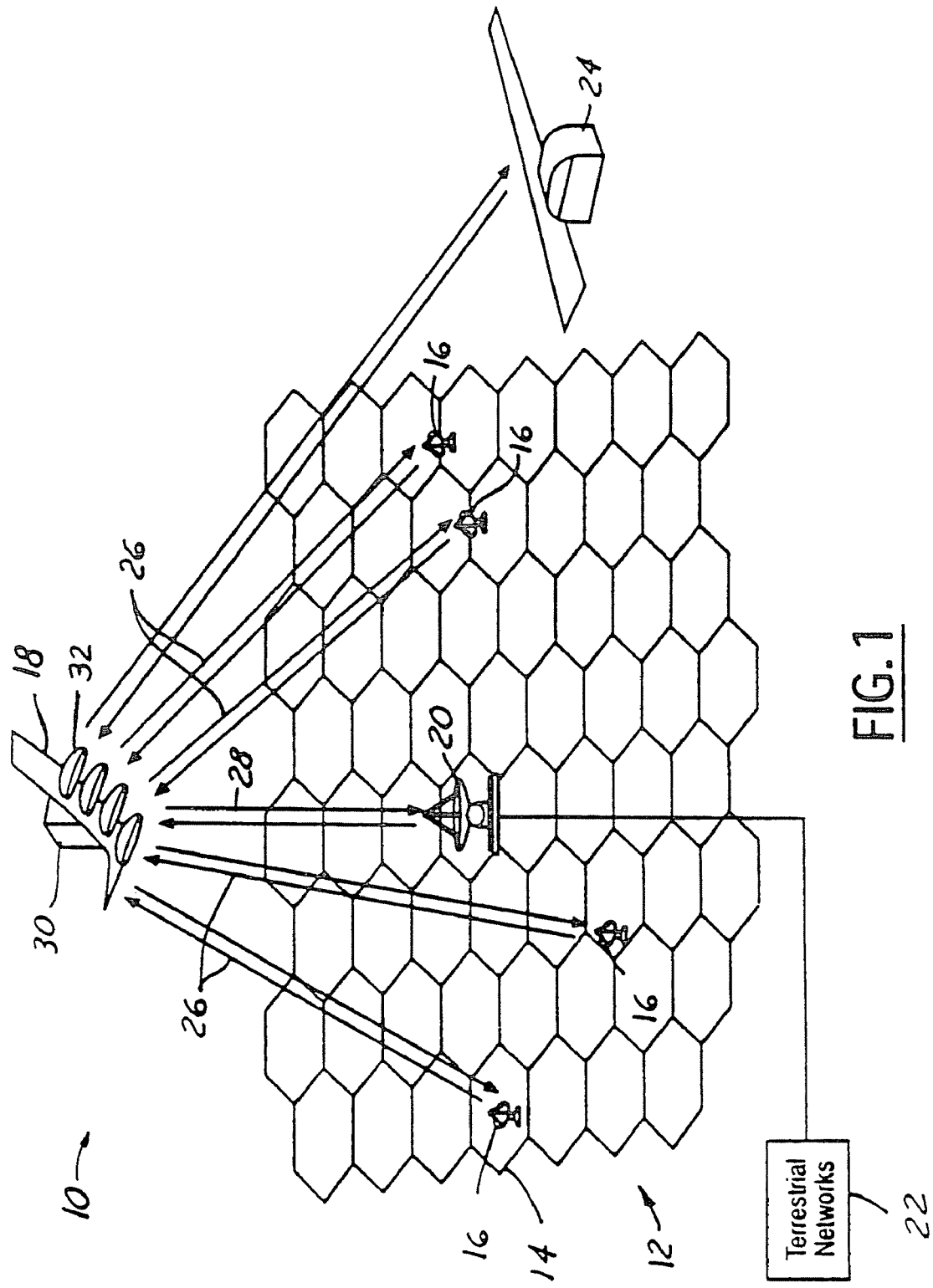
FIG. 1 is a system level view of the communication system according to the present disclosure.

In the following description, the same reference numerals are used to identify the same components in the various views. Those skilled in the art will recognize that various other embodiments, structural changes and changes in exemplary measures may be made without departing from the scope of the disclosure. The following examples use transmitted beams, however, those skilled in the art will recognize the antenna gain patterns are applicable for both transmit and receive mode.

Referring now to FIG. 1, a communications system 10 has a cell pattern 12 that is illustrated as a plurality of hexagons on the earth's surface. The hexagons represent the footprint of a radiated beam onto the earth's surface. These are otherwise known as cells 14. Each cell 14 represents a geographic area that can receive signals from the stratospheric platform with a pre-determined signal strength. A plurality of user terminals 16 are used to illustrate fixed users. Each user terminal 16 may receive a signal with the predetermined signal strength within a spot beam in a multiple spot beam pattern radiated from a communications payload of a high altitude communication device 18.

Communication system 10 further includes a gateway station 20 that is coupled to terrestrial networks 22. Communication system may also include a device operations center 24. Both gateway station 20 and device operations center 24 are in communication with high altitude communication device 18. Gateway station 20 provides connectivity between user terminals 16 and terrestrial networks 22 through high altitude communications device 18. Device operation center 24 provides command and control functions to communications device 18. Although illustrated as two separate units, gateway station 20 and device operation center 24 may be combined into the same physical location.

The communication signals between high altitude communication device 18 and user terminals 16 may be referred to as user links 26. User links 26 represent the transmit and receive beams from user device 16 and high altitude communications device 18. A feeder link 28 is defined between high altitude communications device 18 and gateway station 20.

High altitude communications device 18 is an unmanned vehicle that can fly for several months at an altitude of about 60,000 feet above the earth. Stratospheric platform may be an unmanned vehicle that is a solar-powered, electric plane that is modular in design and may be configured in a variety of ways. The stratospheric platform is operated through the device operations center 24 to fly in a small radius flight path over a given spot on the earth.

High altitude communications device 18 is used as a communication node for gateway station 20 and user terminals 16, each of which has a medium gain antenna with a small beamwidth that is pointed at the direction of the high altitude communications device 18. Although only one gateway station 20 is illustrated in the figure, those skilled in the art would recognize that various numbers of gateway stations may be employed. As will be further described below, gateway station 20 has a high gain antenna with very small beam width that may need a tracking mechanism to maintain a communication link with high altitude communication device 18 throughout the flight path. These antennas may be electronically or mechanically steered.

High altitude communication device 18 has a payload 30 that is used to connect user terminals 16 and gateway station 20. High altitude communication device 18 has an antenna 32 or plurality of antennas that are used to generate and receive beams from user terminals 16 and gateway station 20. As will be further described below, the beams have a main lobe that is directed to a particular cell for communicating therewith. Due to the physical nature of antennas each main beam has parasitic side lobes having an amplitude substantially less than the main lobe but extend outside the intended cell.

Figure 2:
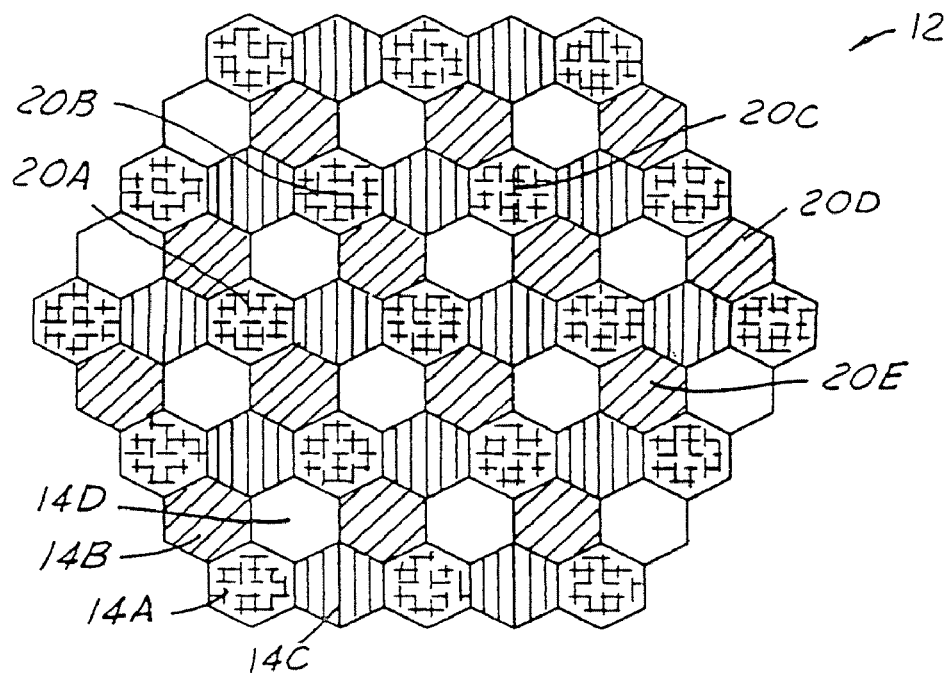
FIG. 2 is reuse plot of a cell coverage map illustrating cells having four communication resources.
Figure 3:
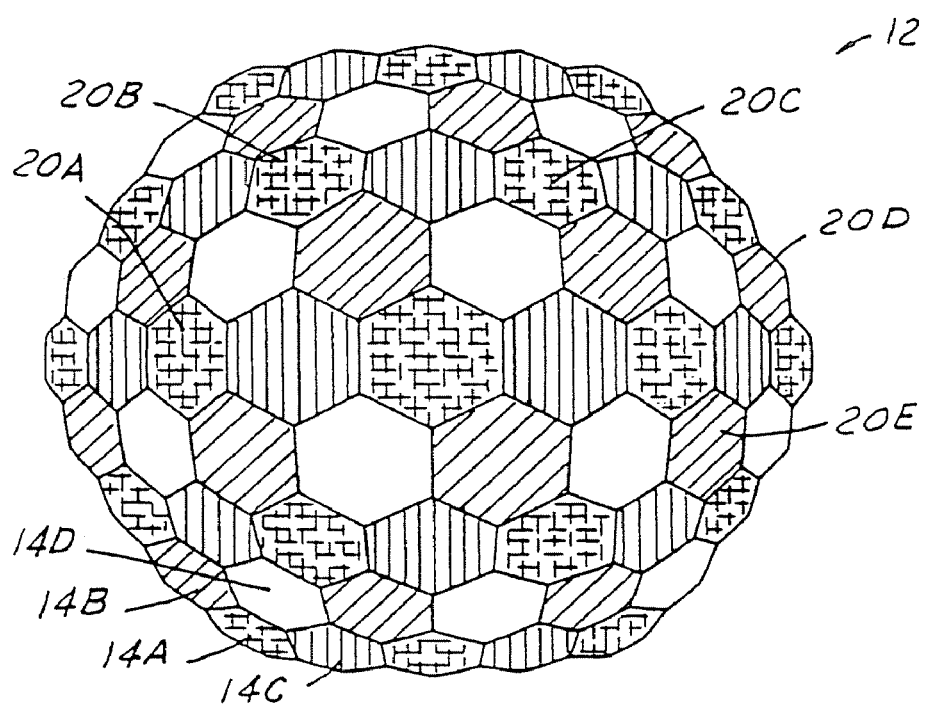
FIG. 3 is a reuse plot of the cell coverage of FIG. 2 from the communication device perspective.

Referring now to FIGS. 2 and 3, a plan view of a cell reuse pattern 12 illustrated having cells 14 in FIG. 2 from the ground perspective. FIG. 3 illustrates the plan view of the cell reuse pattern 12 from the communication device perspective. FIGS. 2 and 3 illustrate an FDMA system with four different frequencies illustrated as four differently cross-hatched areas. This is called a four-beam frequency reuse pattern. Those skilled in the art will recognize that various numbers of frequencies may be used, such as three-beam or 7 beam frequency reused pattern. As illustrated, the entire frequency spectrum is subdivided into four frequency bands. Cells 14A have one frequency band. Cells 14B have a second frequency band. Cells 14C have a third frequency band. And, cells 14D have a fourth frequency band. Each cell belongs to one of either 14A, 14B, 14C or 14D as symbolized by the different cross-hatching. As mentioned above, this disclosure applies equally to orthogonal code in place of frequency band. A plurality of gateway stations 20A, 20B, 20C, 20D and 20E are illustrated.

Figure 4:
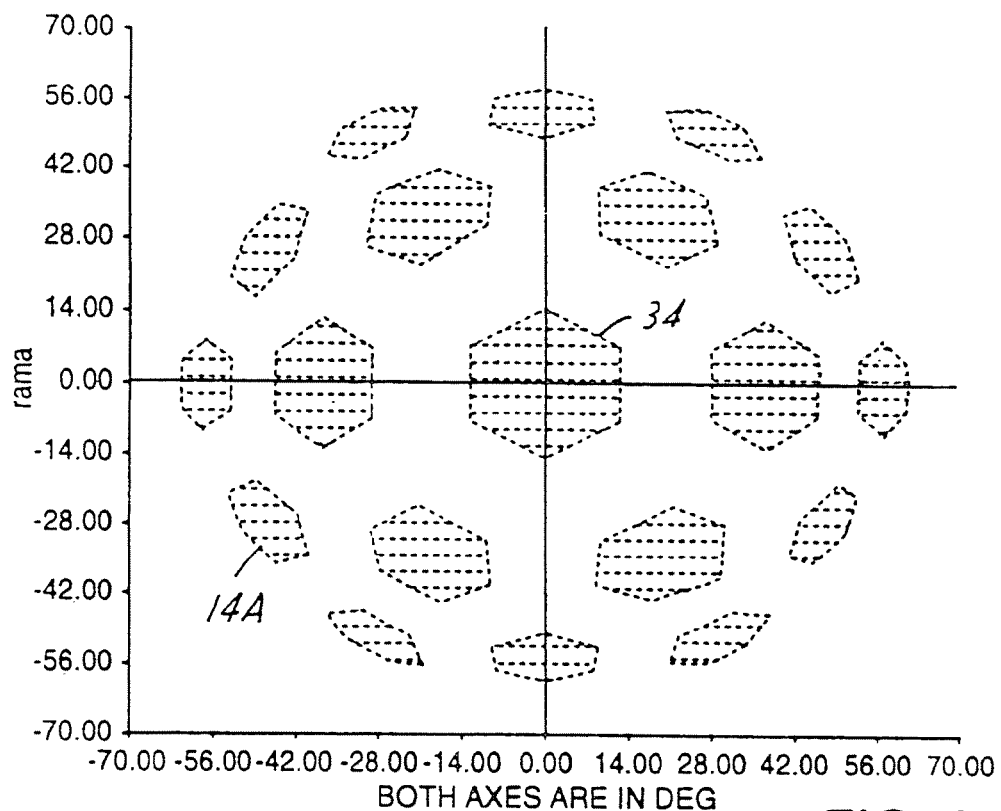
FIG. 4 is a plot illustrating various beams having the same frequency as a central beam.

Referring now to FIG. 4, a plot in degrees from a high altitude communication device is illustrated. This plot is a simplified version of FIG. 3 illustrating only the beams having the same resource as those of 14A of FIG. 3. As shown, a central beam 34 is illustrated.

Figure 5:
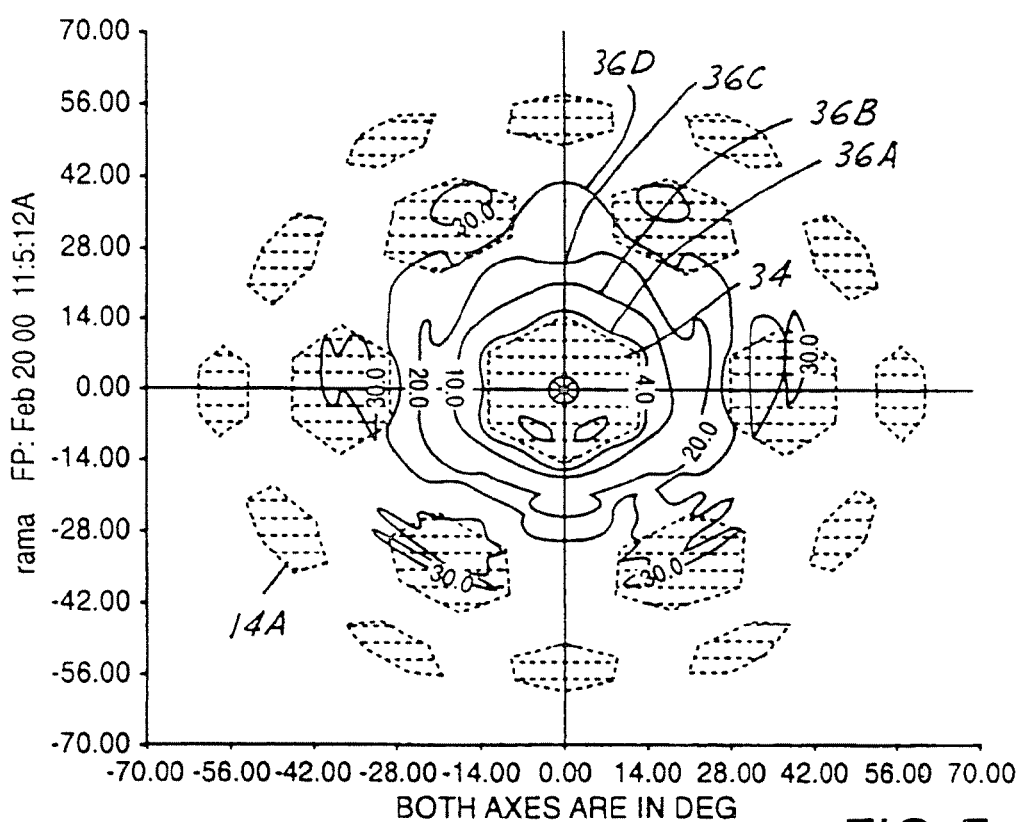
FIG. 5 is the plot of FIG. 4 with the addition of a radiation pattern formed according to the present disclosure for the central beam.

Referring now to FIG. 5, the plot of FIG. 4 is illustrated having the central beam 34 being optimized to prevent interference with other non-central beams 14A. A plurality of lines extending annularally around central beam 34 illustrate the gain change in decibels from the center of the center beam 34. As can be seen, annular ring 36A illustrates a −4.0 decibel drop from the center. Annular ring 34B represents a −10 dB drop from the center. Annular ring 34C represents a −20.0° dB drop from the center. Line 34D represents a −30 dB drop from the center. As can be best seen by the −20.0° dB drop, the antenna of the high altitude device has been manipulated to allow the side lobe interference from the center beam to extend between the adjacent beams 14A. Also, the interference also extends between and around the beams 14A.

Figure 6:
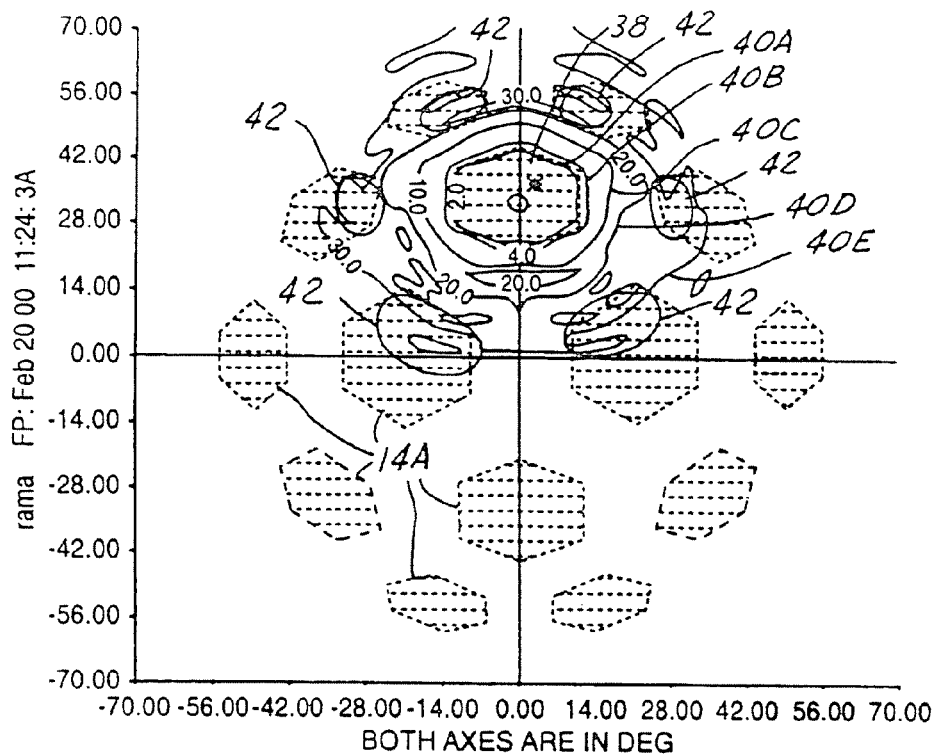
FIG. 6 is a plot illustrating multiple beams with a radiation pattern for an off-center beam formed according to the present disclosure.

Referring now to FIG. 6, non-central beam 38 with annular rings 40 representing the gain drops from the non-central beam 38 is illustrated. In this figure, ring 40A represents a −2.0 dB drop from the center of non-central beam 38. Ring 40B represents a −4.0 dB drop from the center of non-central beam 38. Ring 40C represents a −10 dB drop from the center of non-central beam 38. Ring 40D represents a −20 dB drop from the center of non-central beam 38. Line 40E represents a −30 dB drop from the center of non-central beam 38. As can be seen, suitable side lobe interference is formed by selectively tailoring the shape of the reflector to suppress interference with beams 14A having the same communication characteristics such as frequency, polarization, code, etc.

In operation, advantageously, the present disclosure is capable of achieving high main lobe to side lobe ratio while maintaining peak directivity by shaping the antenna to generate beams to prevent interference with the side lobes of beams using the same communication resource. At the same time, the portions of the beam that do not have the same communication resource are not suppressed. This enables the use of a relatively smaller aperture than those that would ordinarily be used. This allows the payload of the high altitude communication device to not increase due to having to provide a larger antenna aperture. By relaxing requirements on the side lobe, better main lobe performance may be achieved with an antenna design that requires side lobe suppression for all beams. The shape of the antenna changes depending on the specific geometries of the communication system 10. That is, the distance between the beams having the same frequency resource may vary depending on the system and the number of resources used.

Figure 7A:
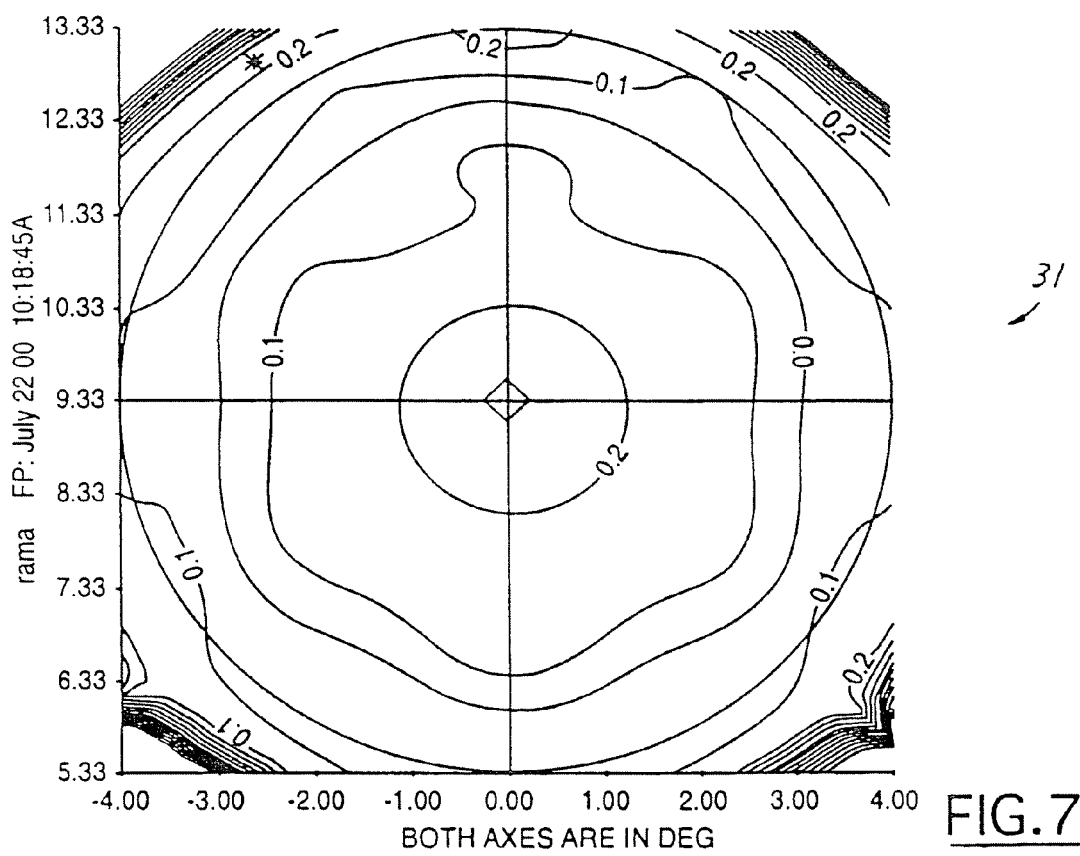
FIG. 7A is a prior art contour plot illustrating an antenna having side lobe interference.
Figure 7B:
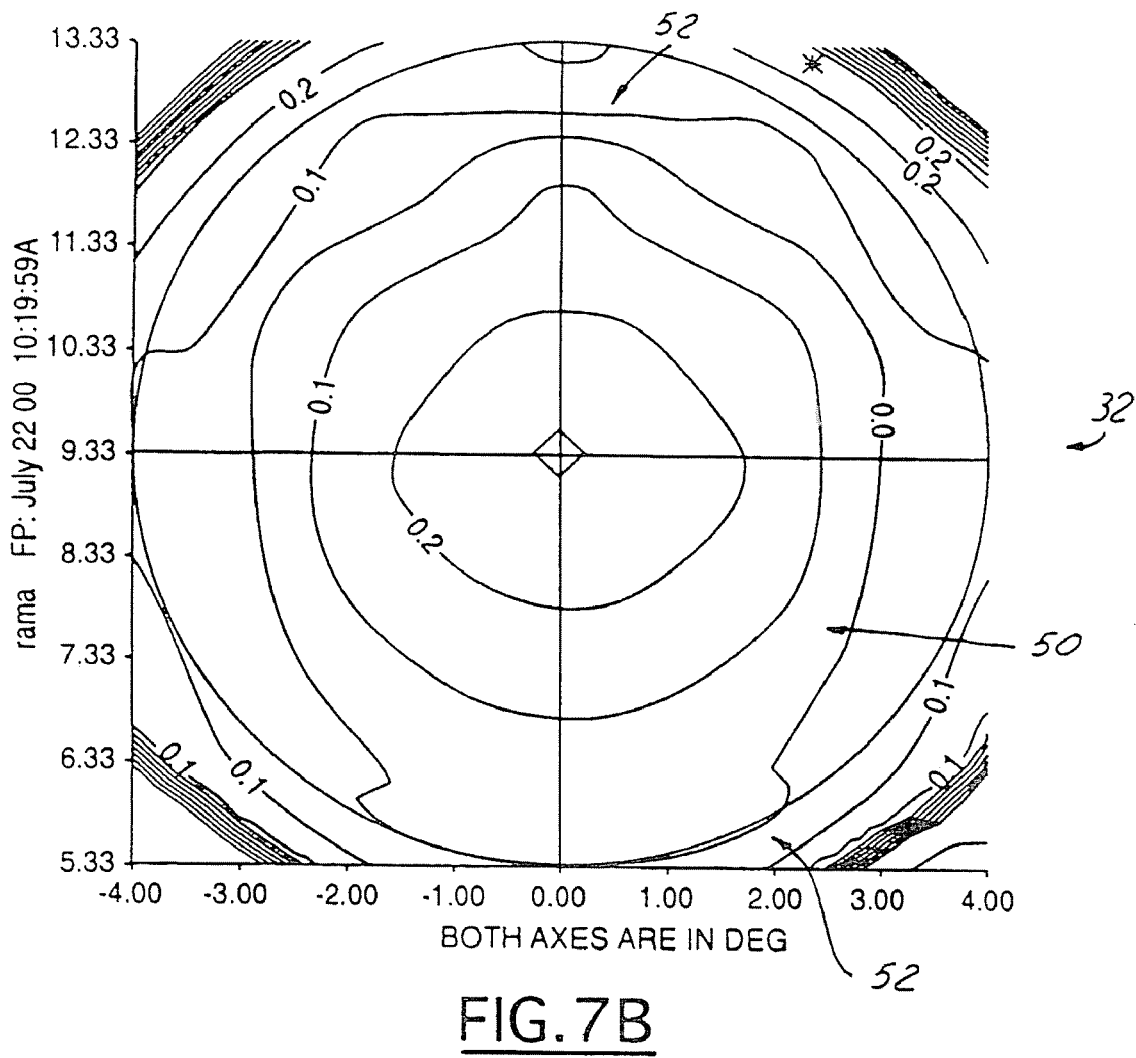
FIG. 7B is a contour plot of an antenna having main lobe portions and side lobe portions formed according to the present disclosure.

Referring now to FIGS. 7A and 7B, a side view of an antenna 31 of the prior art and an antenna 32 is illustrated. A main lobe portion 50 may be first formed so that main lobes of the beams are directed to the desired location. Thereafter, the side lobes portions 52 are formed so that the side lobes are selectively directed to reduce interference with beams using the same resource.

In FIGS. 3 through 5, a four-color reuse pattern is illustrated. However, the present disclosure applied equally to other numbers such as a seven-color reuse or various other reuse patterns as would be known to those skilled in the art. These parameters change the distance required for side lobe suppression because the distance between adjacent beams is changed. If fixed frequency reuse pattern allows the system capacity to be maximized. Interference locations may be experimentally determined directly or using computer simulation. The interference locations are identified and the antenna is shaped to suppress the side lobes where interference locations occur. Interference locations are areas where the side lobe may overlap the beams having the same characteristics. In FIG. 6, the potential interference locations are illustrated by area 42. Of course, the interference locations are highly dependent on the initial antenna configurations and the frequency reuse configuration. The antenna is reshaped to suppress interference at locations 42.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A communication system comprising:
a high altitude communication device having an antenna for generating a first plurality of beams, each of said plurality of beams having a first frequency resource, a plurality of main lobes directed to one of a first plurality of cells and a plurality of side lobes and a second plurality of beams having a second resource directed to one of a second plurality of cells,
said antenna selectively shaped so that said side lobes of said first plurality of beams are selectively suppressed in directions of other beams of said first plurality of cells having said first resource and said side lobes are unsuppressed in the second plurality of cells.

2. A communication system as recited in claim 1 wherein said high altitude communication device comprises a satellite.

3. A communication system as recited in claim 1 wherein said high altitude communication device comprises a stratospheric platform.

4. A method as recited in claim 1 wherein said first resource and said second resource comprise a frequency.

5. A method as recited in claim 1 wherein said first resource and said second resource comprise polarization.

6. A method as recited in claim 1 wherein said first resource and said second resource comprise a code.

7. A method of forming a communication system comprising the steps of:
generating, with an antenna, a fixed reuse pattern having a maximum capacity having a first beam having a first resource and a first plurality of beams having the first resource;
generating, with the antenna, a second plurality of beams having a second resource different than the first resource;
identifying interference locations of said first beam relative to said plurality of second beams;
selectively reshaping an antenna to selectively suppress interference at the interference locations with the first plurality of beams and maintaining the shape of the antenna in non-interference locations, and
maintaining the antenna to not suppress interference at non-interference locations.

8. A method as recited in claim 7 wherein said interference locations correspond to a side lobe of said first beam.

9. A method as recited in claim 7 wherein said first resource and said second resource comprise a frequency.

10. A method as recited in claim 7 wherein said first resource and said second resource comprise polarization.

11. A method as recited in claim 7 wherein said first resource and said second resource comprise an orthogonal code.

12. In a fixed cell communication system generating a fixed reuse pattern using an antenna, a method of reducing interference between beams having side lobes, comprising:
selectively changing a shape of a reflector of the antenna so that side lobe suppression is performed only for beams using a same communication resource and maintaining the shape of the reflector of the antenna to not suppress interference for beams using a different communication resource.

13. A method as recited in claim 12, wherein generating a fixed reuse pattern comprises generating the fixed reuse pattern at a satellite.

14. A method as recited in claim 12, wherein generating a fixed reuse pattern comprises generating the fixed reuse pattern at a stratospheric platform.

* * * * *